United States Patent [19]

Fowler

[11] 4,093,946
[45] June 6, 1978

[54] TWO-WIRE, MULTIPLE-TRANSDUCER COMMUNICATIONS SYSTEM

[75] Inventor: John T. Fowler, Winthrop, Mass.

[73] Assignee: The Laitram Corporation, Harahan, La.

[21] Appl. No.: 662,823

[22] Filed: Mar. 1, 1976

[51] Int. Cl.² .............................................. H04Q 9/00
[52] U.S. Cl. ............................ 340/310 R; 340/310 A; 340/151; 340/408
[58] Field of Search ............... 340/310 A, 310 R, 151, 340/408, 152 T

[56] References Cited

U.S. PATENT DOCUMENTS

| | | | |
|---|---|---|---|
| 3,656,112 | 4/1972 | Paull | 340/310 A |
| 3,729,710 | 4/1973 | Sherwin | 340/310 A |
| 3,786,423 | 1/1974 | Martell | 340/151 |
| 3,848,241 | 11/1974 | Lenay | 340/408 X |

*Primary Examiner*—Harold I. Pitts
*Attorney, Agent, or Firm*—Weingarten, Maxham & Schurgin

[57] ABSTRACT

A system and method for interrogating a plurality of data gathering devices for actuation of selected ones from which data is received. Transducers are typically remotely located from the interrogating and receiving apparatus and are connected via a single two-conductor path over which power is conveyed to the transducers and data signals conveyed between the transducers and the receiving apparatus.

10 Claims, 9 Drawing Figures

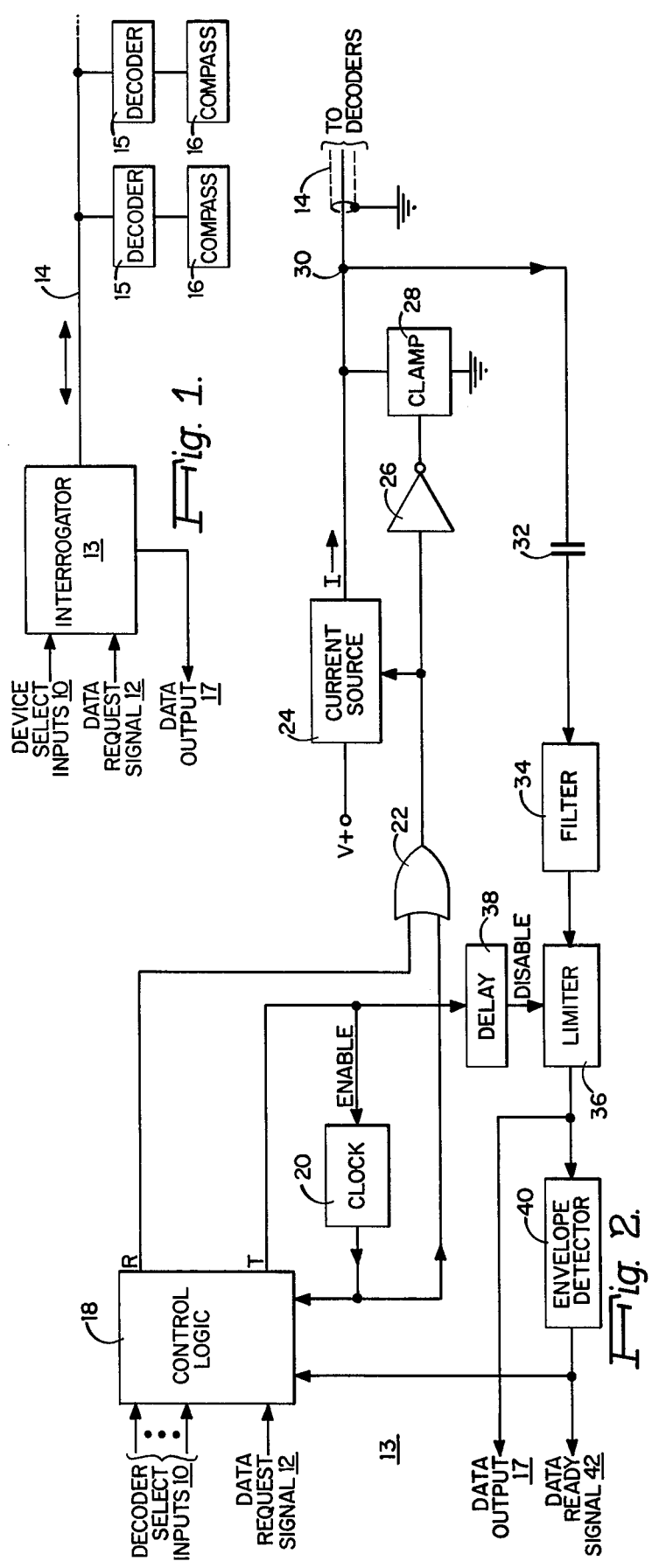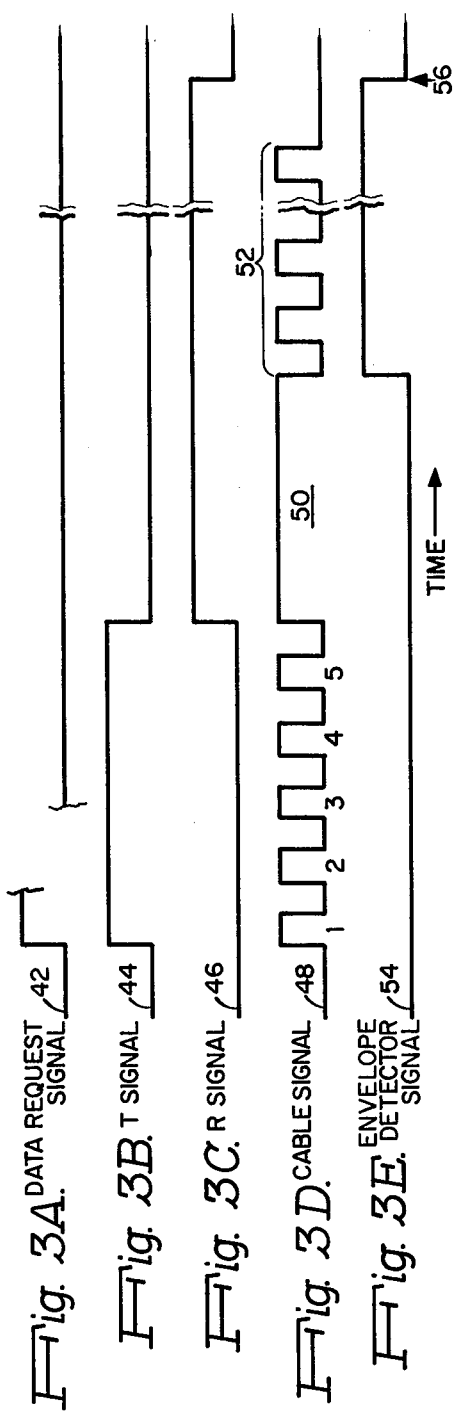

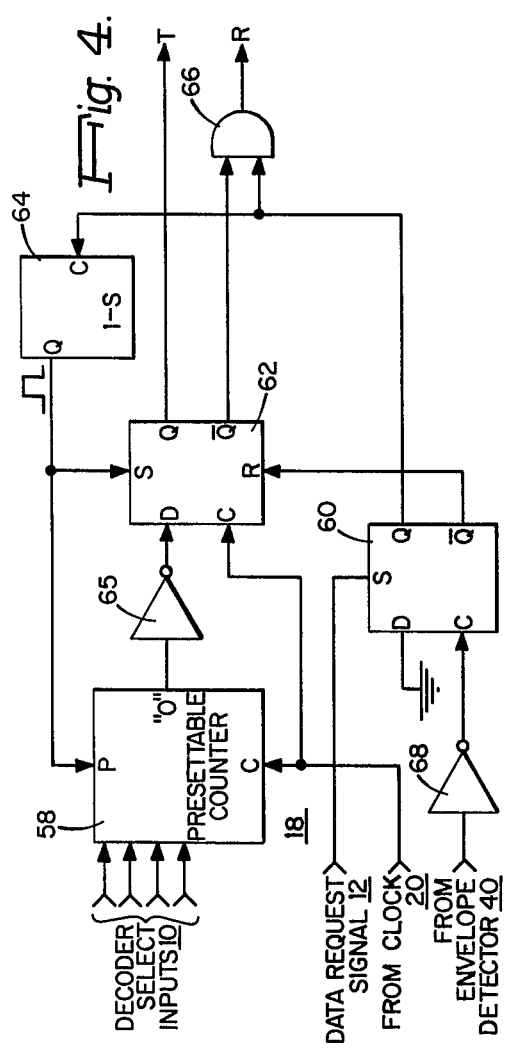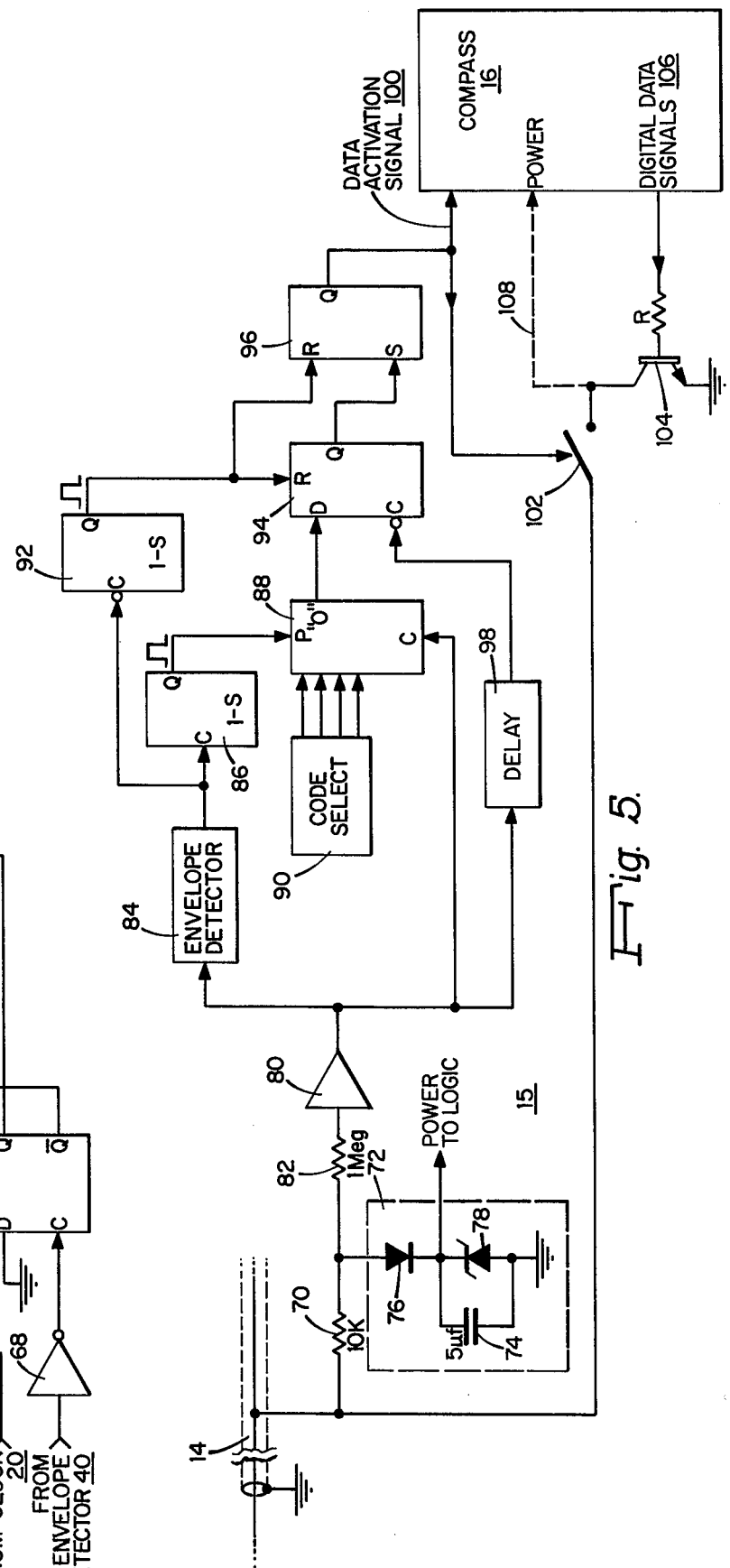

TWO-WIRE, MULTIPLE-TRANSDUCER COMMUNICATIONS SYSTEM

FIELD OF THE INVENTION

This invention relates to data systems and more particularly to a multiple transducer data system for the selective provision of data from each of the transducers in response to selective interrogation thereof.

BACKGROUND OF THE INVENTION

It is often required to collect data from a plurality of remotely located transducers or other type of data gathering devices. For example, in oceanographic and other surveying and analysis, remote reading digital compasses are employed to provide information with respect to the orientation of the structure containing other transducers in which the compasses are disposed. Conventionally, the transducers are connected to a central decoder by respective cables over which power, control and data signals are conveyed. The interconnecting cabling can contribute substantial cost to an overall system especially where a great number of transducers is being employed. Moreover, implementation of such a system is relatively cumbersome by reason of the interconnection of separate cables between the decoder and respective ones of the transducers.

SUMMARY OF THE INVENTION

In brief, the present invention provides a data system for selective actuation of each of a plurality of data gathering devices and for the receipt of data from the activated devices. Each of the data gathering devices includes a decoder operative in response to a predetermined interrogating code upon the detection of which the associated data device is actuated for transmission of data to a central receiving unit. Each of the plurality of decoders is connected to the central unit via a single cable which preferably is of only two-conductor configuration for transmission of both power and data signals. The invention is especially useful for instrumentation in which a plurality of remote reading digital magnetic compasses are employed for selective indication of orientation with respect to the earth's magnetic north. It will be appreciated, however, that the invention is not limited to use with digital compasses but is more broadly useful with many data systems in which a plurality of data gathering devices is to be selectively interrogated for the collection of receipt of data therefrom.

DESCRIPTION OF THE DRAWINGS

FIG. 1 is a block diagram of a system embodying the invention;

FIG. 2 is a block diagram of an interrogator employed in the system of FIG. 1;

FIGS. 3A-3E are waveforms useful in describing the operation of the interrogator of FIG. 2;

FIG. 4 is a schematic diagram of the control logic of FIG. 2; and

FIG. 5 is a schematic diagram of a decoder employed in the system of FIG. 1.

DETAILED DESCRIPTION OF THE INVENTION

Referring to FIG. 1, it can be seen how the invention is used to selectively retrieve digital data from data gathering devices which are remotely located. In response to device select inputs 10 and a data request signal 12 indicating from which of the remotely located devices data is to be sent, interrogator 13 causes the proper signals to be transmitted along cable 14, which is preferably a single two-conductor cable. One or more decoders 15 are connected in parallel to cable 14 and are also connected to a corresponding data device producing digital data which is to be transmitted back to interrogator 13 along cable 14. In FIG. 1, two compasses 16 are shown connected to respective decoders 15 and providing thereto digital information representative of the orientation of each of the compasses 16. Data transmitted in response to signals from interrogator 13 by the selected decoder 15 along cable 14 is received by interrogator 13 and made available for utilization at data output 17.

It is evident that this system for selectively gathering data from many remotely located devices is superior to conventional systems having separate wires which must be routed to each individual device. Interrogator 13 is of a simple and inexpensive design that does not require modification as additional decoder units are added to the system. Only a single two-wire cable is required for communication between interrogator 13 and a multitude of decoders 15. Control signals, data signals and power are all transmitted along a single pair of conductors to and from decoders 15, thus reducing the size and expense of cable 14.

FIG. 2 shows one implementation of an interrogator suitable for use with the invention. During periods when the system is inactive, both a receive or "R" signal and a transmit or "T" signal from control logic 18 are at a logical 0 or "low" level. The low "T" signal disables clock 20, causing its output to remain low. The low output of clock 20 and the low "R" signal are applied to OR gate 22, causing the output thereof to remain low. A low output from OR gate 22 causes current source 24 to be disabled and, through inverter 26, causes clamp circuit 28 to be enabled. The result of this is that a low impedance is connected between the conductors by clamp circuit 28, thus reducing the possibility that spurious signals or noise will be picked up by cable 14, possibly causing an unwanted response by one of the decoders attached to cable 14.

To initiate operation, a digital signal representative of a decoder unit and associated instrumentation module is applied to decoder select inputs 10 of control logic 18. Usually, the device select input will be a binary number representative of a number assigned to the corresponding decoder unit. Upon receiving a data request signal 12, the decoder select inputs 10 are clocked into control logic 18, and control logic 18 causes the "T" signal to go to a logical 1 or "high" end, enabling clock 20. Clock 20 subsequently produces clock pulses which are transmitted to control logic 18 and to OR gate 22. In response to the clock pulses from clock 20, the output of OR gate 22 is alternately high and low, causing current source 24 to be enabled and disabled and clamp 28 to be disabled and enabled. This causes current pulses to be generated by current source 24. Since clamp 28 is disabled during the times that current source 24 is enabled, these current pulses are propagated along cable 14. These decoder address pulses designate which decoder is to be activated. The clock signals from clock 20 applied to control logic 18 are counted by control logic 18. When the number of clock signals reaches the proper number, as determined by device select inputs 10, control logic 18 causes the "T" signal to return low disabling clock 20 and the "R" signal to go high.

The high "R" signal causes the output of OR gate 22 to remain high, turning on current source 24 and causing a constant current to be propagated down cable 14. It can be seen that by alternately placing a high impedance and a short circuit across the conductors of cable 14, while current source 24 is continuously enabled, the voltage at node 30 can be caused to alternate between two binary states. In this manner, a selected decoder unit is able to transmit digital data through cable 14 back to the interrogator unit of FIG. 1. This is described in more detail below. These signals transmitted by the decoder are present at node 30 and are applied through capacitor 32 to filter circuit 34. Capacitor 32 blocks the DC current generated by current source 24 and passes the higher frequency digital pulses generated at node 30 by the decoder. Filter 34 attenuates high frequency noise signals which may be picked up by cable 14 and which might otherwise cause errors in the data output 16 of the interrogator circuit.

The output of filter 34 is applied to limiter 36. Limiter 36 is disabled while the interrogator 13 is transmitting pulses, to prevent these pulses from appearing at data output 17, by the "T" signal from control logic 18 applied through delay unit 38. Delay unit 38 causes limiter 36 to remain disabled for a short period after the "T" signal goes low to insure that spurious signals which might be generated when switching from transmit to receive mode are not passed by limiter 36. The output of filter 34 is amplified and limited by limiter 36 so that the output of the limiter is a two-level digital signal. The data output 16 is taken from the output of limiter 36.

The output of limiter 36 is also applied to envelope detector 40. After limiter 36 has been enabled, the first pulse on cable 14 from a decoder circuit, after being filtered by filter 34 and limited by limiter 36, causes the output of envelope detector 40 to go high. The output of envelope detector 40 remains high between the digital pulses transmitted by the decoder and goes low only after the decoder has finished transmitting digital information. Envelope detector 40 may be implemented, for example, by a retriggerable monostable multivibrator. The output of envelope detector 40 is applied to control logic 18; and when this output goes low, indicating that data transmission by the decoder has been concluded, control logic 18 causes receive signal "R" to go low, disabling current source 24 and enabling clamp circuit 28. The voltage across the two conductors of cable 14 is held at 0 by clamp circuit 28 and the interrogator circuit is ready to repeat the process upon receipt of another data request signal 12. The output of envelope detector 40 may also be used to furnish a data ready signal 42.

FIG. 3 shows typical waveforms employed by the circuitry of FIG. 2 and useful in explaining the operation thereof. At the time that data request signal 10 goes high, indicated by signal 42 of FIG. 3A, the signals present at device select inputs 10 are clocked into control logic 16 and the "T" signal, shown by signal 44 of FIG. 3B, goes high. As indicated in FIG. 3A, the exact time at which data request signal returns low is not important. While "T" signal 44 is high, clock 20 causes pulses to be produced on cable 14 as shown by cable signal 48 in FIG. 3D. After the appropriate number of decoder address pulses have been produced on cable 14 as determined by the signals present at device select inputs 10, "T" signal 44 returns low and "R" signal 45 (FIG. 3C) goes high. This causes cable signal 48 to go high where it will remain until it is caused to go low by the action of a decoder unit. In the illustrated example, cable signal 48 contains five address pulses which would identify and activate decoder unit number five, after which "T" signal 44 goes low and "R" signal 46 goes high, forcing cable signal 48 high. For a period after "R" signal 46 and cable signal 48 go high, no signals are transmitted back to interrogator 13 by the decoder, as shown by time 50 in FIG. 3D. During this time, the DC current from current source 24 is used by the decoder to charge up its power supply to provide power for the decoder to transmit digital data back to interrogator 13. After pausing a sufficient time to allow its power supply to charge up, the decoder alternately shorts and opens the conductors in cable 14, producing digital signals which are detected by interrogator 13, as shown by signals 52 in FIG. 3D. Envelope detector signal 54 (FIG. 3E) goes high upon the occurrence of the first pulse transmitted by decoder 15 and remains high between pulses, returning to a low state only after the data pulses from decoder 15 have ceased, as shown at time 56 in FIG. 3E. The falling of envelope detector signal 54 causes "R" signal 46 to return to a low state.

FIG. 4 shows one implementation of control logic 18. Decoder select inputs 10 are applied to preset inputs of a presettable counter, which as in this example may be a presettable down counter. Four inputs are shown in FIG. 4; however, the circuit is easily modified to accommodate a smaller or larger number of possible decoder selection codes. In the non-active state while the interrogator is waiting for a data request signal, D flip-flops 60 and 62 are in the zero state, i.e., the Q outputs of the flip-flops are both at a logical zero. Data request signal 12 goes to the set input of flip-flop 60, and when data request signal 12 goes high, flip-flop 60 is set to the one state. The Q output of flip-flop 60 is applied to the input of monostable 64, which is triggered by the rising edge of the Q output from flip-flop 60. In response to this, monostable 64 generates a pulse of very brief duration which is applied to the preset input of presettable down counter 58, causing it to be preset to a number determined by the device select inputs 10. The output from monostable 64 is also applied to the set input of flip-flop 62 which causes this flip-flop to be set to a one state. The Q output of flip-flop 62 corresponds to the "T" signal from control logic 18. In response to a high level for the "T" signal, clock 20 is enabled, and clock signals from clock 30 are applied to the clock input of counter 58. Counter 58 counts down as it is clocked by the clock signals until it reaches a zero state, which state is indicated by a high level signal appearing at the normally low "0" output of counter 58. This high signal is inverted by inverter 65, the output of which is applied to the D input of flip-flop 62 and clocked into flip-flop 62 by the next clock pulse from clock 20. Flip-flop 62 goes from the one state to the zero state, and the "T" signal goes low. The high Q output of flip-flop 60 in the one state and the high output from the Q output of flip-flop 62 enable AND gate 66, whose output thereupon goes high and to produce a high "R" signal.

The "R" signal remains high until flip-flop 60 is clocked by the falling edge of the signal from envelope detector 40, as described above, after it has been inverted by inverter 68. This causes flip-flop 60, whose D input is grounded, to go to a zero state; and the resulting high output at the Q output of flip-flop 60 resets flip-flop 62 to the zero state. At this point, both flip-flop 60 and flip-flop 62 are in the zero state and the control circuit 18 is ready to repeat the above process in response to another high data request signal 12.

FIG. 5 shows one embodiment of a decoder circuit 15 suitable for use with the interrogator circuit of FIG. 2. The decoder 15 is attached to cable 14. Cable 14 is connected to interrogator circuit 13 and may be connected to other decoder circuits elsewhere along its length. The signal on cable 14 goes through a buffer resistor 70, of exemplary value 10K ohms, to power supply circuit 72. Current from current source 24 in interrogator 13 is divided more or less evenly by resistors 70 among power supplies 72 of the several decoders which may be attached to cable 14. During periods when the voltage on cable 14 is high, a capacitor 72 of exemplary value 5 microfarads is charged through diode 76, connected as shown. During periods when the voltage on cable 14 is at or near zero volts, diode 76 prevents the charge accumulated on capacitor 74 from discharging. Voltage to power the logic of decoder 15 is taken from capacitor 74. Logic used in decoder 15 is typically CMOS logic and requires very little power, allowing the voltage on capacitor 74 to remain high enough during periods of low voltage on cable 14 to insure reliable operation of the logic circuitry. Zener diode 78 is connected across capacitor 74 to prevent the voltage applied to the logic circuitry from exceeding a maximum level. In practice, the voltage on capacitor 74 will remain close to the value determined by Zener diode 78. Because of this, the signal applied to buffer inverter 80 through resistor 82 is a digital signal with a high level equal or close to the Zener voltage of Zener diode 78 and is a low level close to zero volts.

Upon transmission by interrogator circuit 13 of the first of the decoder address pulses, the output of envelope detector 84 goes high, activating monostable 86. The resulting pulse produced by monostable 86 is applied to the preset input of presettable down counter 88, which is similar in operation to counter 58 shown in FIG. 4 and described above. This pulse causes counter 88 to be preset to a number determined by the signals present at the preset inputs. These preset inputs come from code selection means 90 which may be implemented by permanent wiring, thumbwheel switches, or otherwise. The output of buffer 80 is also applied to the clock input of counter 88. In response to the rising edges following the initial address pulse which presets the counter, counter 88 will count down until it reaches zero, at which point, the "0" output of the counter will go high. If the selection code of decoder 15, as determined by code select means 90, is equal to the number of pulses transmitted by interrogator 13, counter 88 will be at the zero state when address pulses cease to appear on cable 14, shown as time 50 in FIG. 3D. It can be seen from FIG. 3D that even though counter 88 is preset and does not count during the first pulse received from interrogator 13, the number of rising edges clocking counter 88 following the first pulse is equal to the number of address pulses. If the number preset into counter 88 via code selection means 90 is greater than or less than the number of address pulses transmitted, counter 88 will be at other than its zero state when it stops counting.

The output of envelope detector 84 will remain high between the address pulses transmitted along cable 14. After the address pulses have been transmitted, the output of envelope detector 84 goes low. Monostable 92 is triggered by the falling edge of the output signal from envelope detector 84 and produces a short pulse in response thereto. This pulse resets D flip-flop 94 and RS flip-flop 96. Delay unit 98 operates in much the same manner as envelope detector 84, going high upon the first address pulse and remaining high during the succeeding address pulses. The output of delay unit 98 goes low a specified time after the termination of the address pulses, and this time is chosen so that the falling edge from delay unit 98 occurs after flip-flop 94 and flip-flop 96 have been reset by the pulse from one-shot 92. The falling edge of the signal from delay unit 98 clocks the flip-flop 94. As explained above, when the number of address pulses received is equal to the number preset into counter 88, the "0" output signal from counter 88 is high, and the output of flip-flop 94 will go high upon being clocked by the output from delay unit 98. This high output from D flip-flop 94 sets RS flip-flop 96, causing the Q output thereof to go high.

The high output from RS flip-flop 96 serves as an activation signal 100 which activates the digital data gathering device associated with the decoder, exemplified in FIG. 5 by compass 16. The high signal from RS flip-flop 96 also causes switch 102 to close, connecting shunting circuit 104 across the conductors of cable 14. Shunt circuit 104 can be implemented using a transistor as shown in FIG. 5, or by any other suitable means, including other types of semiconductor switches, reed switches, relays, etc. The digital data signals commence upon a high level present at activation signal 100; and in response to digital data signals 106 applied to shunt circuit 104, the signal across cable 14 is selectively shorted, causing variations in the voltage across cable 14.

The pulses transmitted along cable 14 by shunt circuit 104 are detected by envelope detector 84 in the same manner that the address pulses were detected, forcing the output of envelope detector 84 to remain high. Upon cessation of data from compass 16, the output of envelope detector 84 will return low, triggering one-shot 92 and causing a pulse therefrom. This pulse resets D flip-flop 94 and RS flip-flop 96. The low level present at the output of RS flip-flop 96 deactivates compass 16 and causes switch 102 to disconnect shunt circuit 104 from digital data signals 106 coming from compass 16. If desired, power for compass 16 can be derived from the current pulses transmitted along cable 14 by interrogator 13. In this case, the connection 108 may be made connecting the power input of compass 16 to cable 14 through switch 102. The power supply circuit of compass 16 is then similar to decoder power supply circuit 72.

It will be appreciated that the particular embodiment of the invention described above can be modified by those of ordinary skill in the art to meet the requirement of different applications without departing from the scope of the invention. Accordingly, it is not intended to limit the invention by what has been particularly shown and described, except as indicated in the following claims.

What is claimed is:

1. A system responsive to data request signals for retrieving data from a selected one of a plurality of data gathering devices remotely located and connected in parallel to a single cable, comprising:
an interrogator responsive to data request signals including:
means for transmitting an address signal along the cable indicative of the particular data gathering device from which data is to be retrieved; and
means for applying a constant signal to the cable after the address signal has been transmitted;

one or more decoders each associated with a corresponding data gathering device and each including:

means for comparing the address signal transmitted along the cable with an identification signal uniquely identifying the decoder to produce an enabling signal upon correspondence thereof for activating the corresponding data gathering device; and corresponding means responsive to the enabling signal for selectively connecting a low impedance across the cable conductors in response to digital data from the data gathering device;

the digital data from the selected data gathering device being reproduced at the interrogator by detecting the variations in the signal level across the cable produced by the responding means.

2. The system of claim 1 wherein the cable along which signals are transmitted has only two conductors; and wherein power for the decoder circuitry is also provided along the same two-conductor cable.

3. The system of claim 2 wherein the transmitting means further includes:

pulse means responsive to data request signals for transmitting along the cable a series of pulses, the number of which is representative of the selected data gathering device.

4. The system of claim 3 wherein the comparator means in the decoder includes:

means for counting the number of pulses in the address signal transmitted by the interrogator;

means for determining when the address signal has been transmitted by detecting the constant signal applied to the cable after the signal has been transmitted;

means for comparing the number of pulses, after determining that the address signal has been transmitted, with a number representative of the corresponding data gathering device and for producing the enabling signal upon equality of the compared signals.

5. The system of claim 4 wherein the decoder further includes means for producing a delay between the end of the address signal and the transmitting of data from the corresponding data gathering device, during which delay power from the constant signal applied to the cable is stored in the decoder for use during the transmission of data from the decoder to the interrogator.

6. The system of claim 5 wherein the data gathering devices include one or more compasses producing digital output signals representative of the heading of each.

7. A method for selectively activating and receiving data from a selected one of one or more remotely located data gathering devices connected in parallel to a single two-conductor cable, comprising the steps of:

at a first location along the cable:

generating a first digital signal representative of a selected data gathering device to be activated;

transmitting along the cable a series of pulses, the number of pulses being determined by the first digital signal; and after the number of pulses determined by the first digital signal have been transmitted, continuously connecting a constant signal to the cable;

at one or more second locations along the cable having data gathering devices located thereat:

receiving and counting the pulses transmitted along the cable from the first location;

comparing the number of pulses received with a predetermined address number uniquely identifying each of the decoders and corresponding data gathering devices, an enabling signal being generated when the number of received pulses equal the predetermined address number; and upon the occurrence of an enabling signal, transmitting digital data from the data gathering device by selectively connecting a low impedance across the cable in response to digital signals from the data gathering device, thereby selectively reducing the voltage across the cable; and detecting the voltage across the cable at the first location to determine the transmitted digital data.

8. The method of claim 7 further including the step of producing power at the second locations by charging a capacitor from current flowing in the cable.

9. The method of claim 8 further including the step of:

at the first location, determining when the data pulses produced at the selected second location have ended; and disconnecting the constant signal from the cable and connecting a low impedance between the cable conductors upon determining that the data pulses have ended.

10. A system responsive to data request signals for retrieving data from a selected one among one or more digital compasses remotely located and connected in parallel to a single cable, comprising:

an interrogator, including:

means responsive to the data request signals for transmitting an address signal along the cable indicative of the particular digital compass from which data is to be retrieved; and means for applying a constant signal to the cable after the address signal has been transmitted;

one or more decoders, each associated with a corresponding compass and each including:

means for comparing the address signal transmitted along the cable with an identification signal uniquely identifying the decoder and for producing an enabling signal when the transmitted signal corresponds to the identification signal; and means responsive to the enabling signal for activating the corresponding digital compass and for selectively connecting a low impedance across the cable conductors in response to digital data therefrom;

the digital data from the selected compass being reproduced at the interrogator by detecting the variations in the signal level across the cable.

* * * * *

UNITED STATES PATENT AND TRADEMARK OFFICE
CERTIFICATE OF CORRECTION

PATENT NO. : 4,093,946
DATED : June 6, 1978
INVENTOR(S) : John T. Fowler

It is certified that error appears in the above-identified patent and that said Letters Patent are hereby corrected as shown below:

Column 4, line 56, "Q" should be --$\bar{Q}$--.

Column 4, line 65, "Q" should be --$\bar{Q}$--.

Signed and Sealed this

Ninth Day of January 1979

[SEAL]

Attest:

RUTH C. MASON
*Attesting Officer*

DONALD W. BANNER
*Commissioner of Patents and Trademarks*